United States Patent [19]

Anderson et al.

[11] 4,244,202
[45] Jan. 13, 1981

[54] APPARATUS FOR MAKING CORRUGATED FLEXIBLE METAL TUBING

[75] Inventors: Leroy E. Anderson; Michael P. Schmidt; William W. Weaver, all of Detroit Lakes, Minn.

[73] Assignee: Manufacture Systems, Inc., Detroit Lakes, Minn.

[21] Appl. No.: 953,098

[22] Filed: Oct. 20, 1978

Related U.S. Application Data

[63] Continuation of Ser. No. 813,894, Jul. 8, 1977, abandoned.

[51] Int. Cl.³ .................. B21C 37/12; B23D 45/12
[52] U.S. Cl. .................................... 72/49; 72/132; 83/308; 83/318
[58] Field of Search ............... 72/49, 50, 129, 132, 72/135; 82/53.1; 83/308, 314, 318

[56] References Cited

U.S. PATENT DOCUMENTS

| 684,539 | 10/1901 | Cartwright | 83/308 |
| 1,643,994 | 10/1927 | Parsons | 83/308 |
| 3,677,046 | 7/1972 | Carroll | 72/129 |

FOREIGN PATENT DOCUMENTS

| 1164202 | 2/1964 | Fed. Rep. of Germany | 83/318 |
| 2046284 | 9/1971 | Fed. Rep. of Germany | 72/49 |
| 830504 | 3/1960 | United Kingdom | 72/50 |

*Primary Examiner*—Ervin M. Combs
*Attorney, Agent, or Firm*—Schroeder, Siegfried, Ryan, Vidas, Steffey & Arrett

[57] ABSTRACT

A readily adjustable machine which continuously produces corrugated flexible metal tubing from very light gauge metal and of various diameters. A warping ring receives therewithin a longitudinally corrugated narrow strip of formable metal of light gauge and warps the same helically to produce convolutions by means of a helical warping surface which extends into one of the longitudinal corrugations. The size of the tube produced can be varied by merely substituting a warping ring of a different size. A uniquely shaped pair of die-forming rollers have lock-seam forming surfaces which are adjustable relative to each other to provide variation in the degree to which the seam will permit and withstand axial torque. The lock seam is constructed to be symmetrical about the neutral axis of the corrugation and about the slope line of the common corrugation leg of adjacent convolutions which it constitutes. The lock is provided by its radially extending deformations in its longitudinal medial portions and terminal portions, with intermediate portions therebetween extending at about 60 degrees thereto. The terminal portions extend around the bottoms of each of the U-shaped seam elements to further lock them in place. A flying saw automatically cuts off predetermined lengths of the tubing. The length of the sections to be cut may be varied by merely re-positioning a movable switch in the path of the tube. The tube has a unique lock-seam which is constructed to withstand greater flexing, greater axial twist and more stress without damage and without opening, and is stronger.

9 Claims, 18 Drawing Figures

APPARATUS FOR MAKING CORRUGATED FLEXIBLE METAL TUBING

This is a continuation, of application Ser. No. 813,894, filed July 8, 1977, abandoned.

This invention relates to corrugated flexible cylindrical ducts made from narrow strips of formable metal such as light gauge aluminum and so constructed and arranged as to preclude separation of the adjacent convolutions of the metal strip as a result of either axial compression or tension. The machine for making such ducts disclosed herein is characterized by the absence of any mandrel, by the presence and usage of a warping ring for warping a strip in contiguous convolutions, and by adjustable lock-seam forming rollers which form a uniquely shaped and constructed lock seam as a common leg of a corrugation of contiguous convolutions of the strip.

This application is related to the prior pending application, Ser. No. 410,234 entitled FLEXIBLE CYLINDRICAL METAL TUBE AND APPARATUS FOR MAKING SAME, invented by Leroy E. Anderson, and constitutes an improvement thereof.

There is an industry recognized need for flexible metal ducts which can be manufactured quickly and easily of very lightweight metal, such as aluminum of light gauge, and which can be bent about a sharp radius and/or, subjected to axial compression or tension without separation of the seam which joins the contiguous convolutions of the strip. The flexible tubing disclosed herein has seam structure so constructed and arranged as to permit flexing or bending about a smaller radius than there has heretofore been known and offers much greater resistance to separation at the same under repeated flexing or other undue stresses.

It is recognized in the industry that one of the serious problems in the use of flexible cylindrical tubing made of lightweight corrugated metal is the vulnerability of the tubing heretofore known to appreciable axial tension and/or axial compression. Because of the lock seam construction disclosed and claimed herein, the flexible tubing manufactured in accordance with the disclosure of this application is highly desirable and much to be preferred over constructions heretofore known.

It is a general object of our invention to provide a novel and improved lock seam in a corrugated flexible tube made of light gauge formable metal, such as aluminum.

A more specific object is to provide a novel and improved flexible metal tube having increased strength, greater flexibility, and capable of withstanding greater axial torque and repeated flexing.

Another object is to provide a novel and improved flexible metal tube having a lock-seam constructed and arranged to provide greater ability to withstand repeated flexing and axial torque, and to permit flexing about a minimum radius without danger of the seam opening.

Another object is to provide a novel and improved machine for producing corrugated metal flexible tubing which can be quickly and easily modified to produce tubing of different diameters.

Another object is to provide a novel and improved machine which can continuously produce flexible metal tubing and automatically cut the tubing into any desired length as it is produced.

Another object is to provide novel and improved methods of producing corrugated metal tubing from a narrow strip of thin metal, such as aluminum, and having improved physical qualities as a result of a unique arrangement and construction of a lock-seam connecting the adjacent convolutions of the strip.

Another object is to provide novel and improved methods of producing a stronger and more versatile lock-seam within the corrugations of a corrugated thin metal tube.

Another object is to provide a novel and improved method of forming a flat narrow strip of metal of light gauge into a helically circular form emanating as a flexible tube or pipe.

Another object is to provide a novel and improved method of forming a flat narrow strip of light gauge metal into a tube which requires minimal work upon the metal within the strip and, consequently, minimal hardening of the metal.

Another object is to provide a novel and improved cross-sectional configuration in a seam of a corrugated flexible metal tube which has quadruple locking points or locations.

These and other objects and advantages of our invention will more fully appear from the following description, made in connection with the accompanying drawings, wherein like reference characters refer to the same or similar parts throughout the several views, in which.

Figure 1:
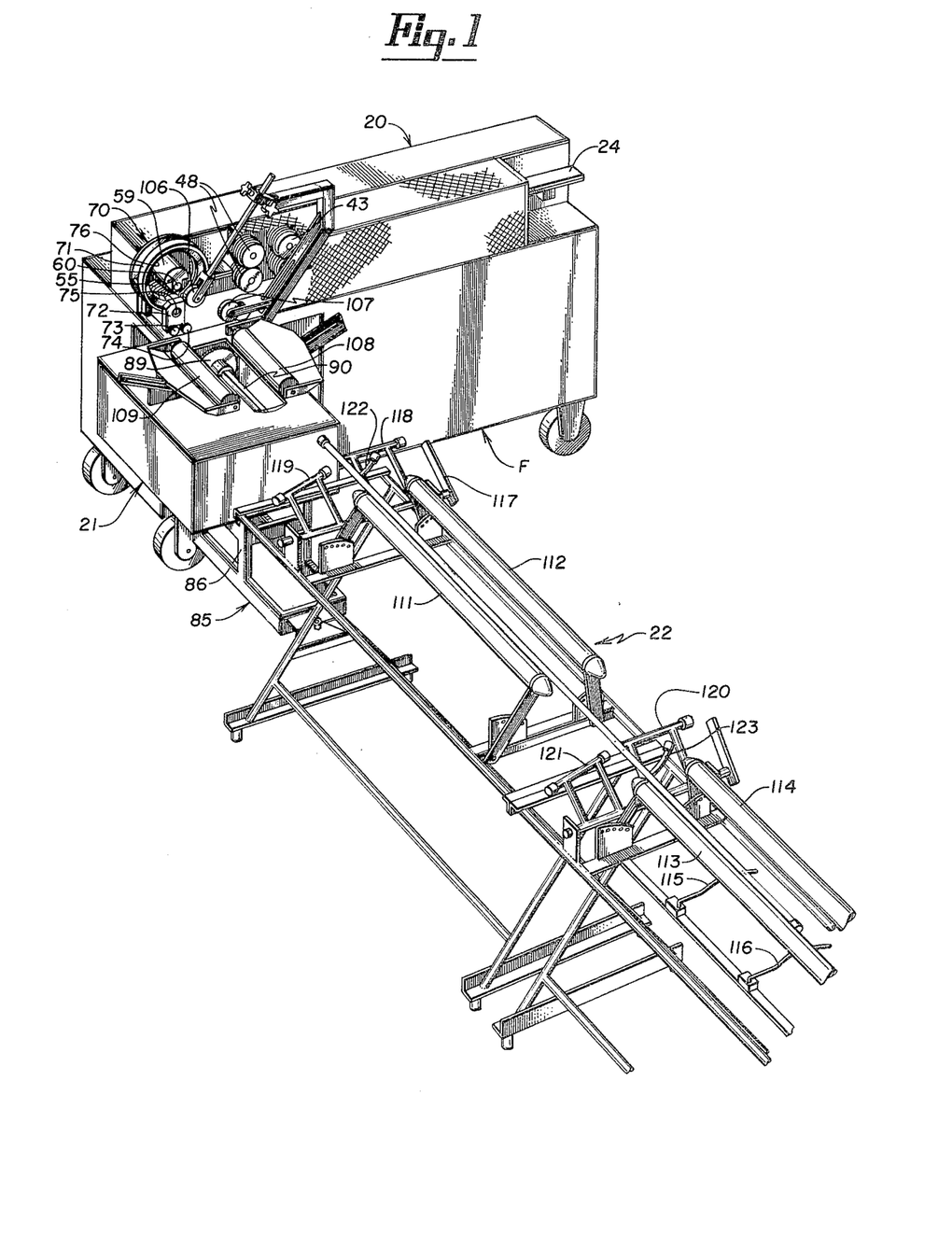
FIG. 1 is a pictorial view of the entire apparatus utilized in practicing our inventions.

As shown in FIG. 1, the corrugated flexible metal tubing is formed and cut in sections upon a machine consisting of a roller mill 20, an attached flying saw assembly 21, and a run-out table 22. The details of the roller mill 20 can best be seen by reference to FIGS. 2 and 3 wherein there is shown a decoiler 24 of a roll of a narrow strip of metal 25 of light gauge and readily deformable, such as aluminum. The machine shown is designed to fabricate tubing using 3003 aluminum, 0 temper. The gauge thickness is 0.0065 inches and the stock width is 2.3125 inches.

Figure 4:
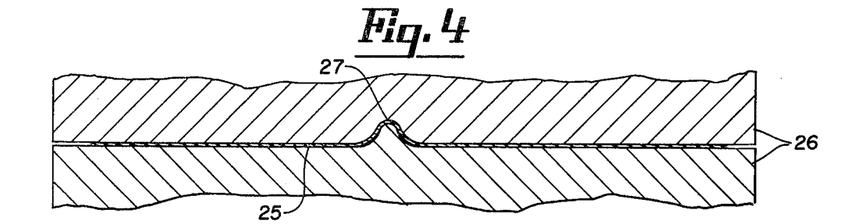
FIG. 4 is a schematic fragmentary sectional view taken at line 4—4 of FIG. 2 through the rollers which initially engage the strip of metal and form the first corrugation therein.

As the strip of metal 25 leaves the decoiler 24, it is fed through lubricating rolls which are a part of the decoiler. These rolls place a thin film of lubricant of the water based disappearing type upon both sides of the strip. As the strip 25 proceeds through the first set of rollers 26, the first corrugation is formed adjacent the center of the strip as shown at 27 in FIG. 4, the rollers 26 being shaped as shown therein to deform the metal in the manner shown in that figure.

Figure 5:
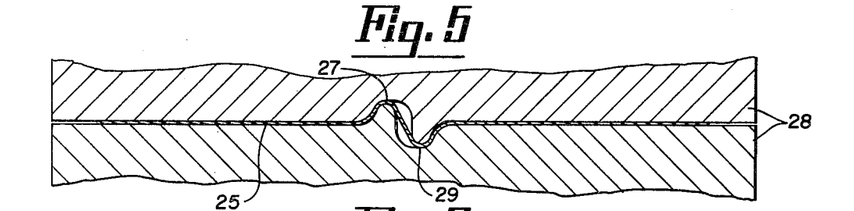
FIG. 5 is a schematic fragmentary sectional view taken at line 5—5 of FIG. 2 through the second set of rollers which further deform the strip, as shown.

As the strip 25 is driven through the next pair of rollers 28, an additional deformation as shown at 29, in FIG. 5, is die-formed therein, the rollers having configurations as shown therein, to induce the corrugations as also shown.

Figure 2:
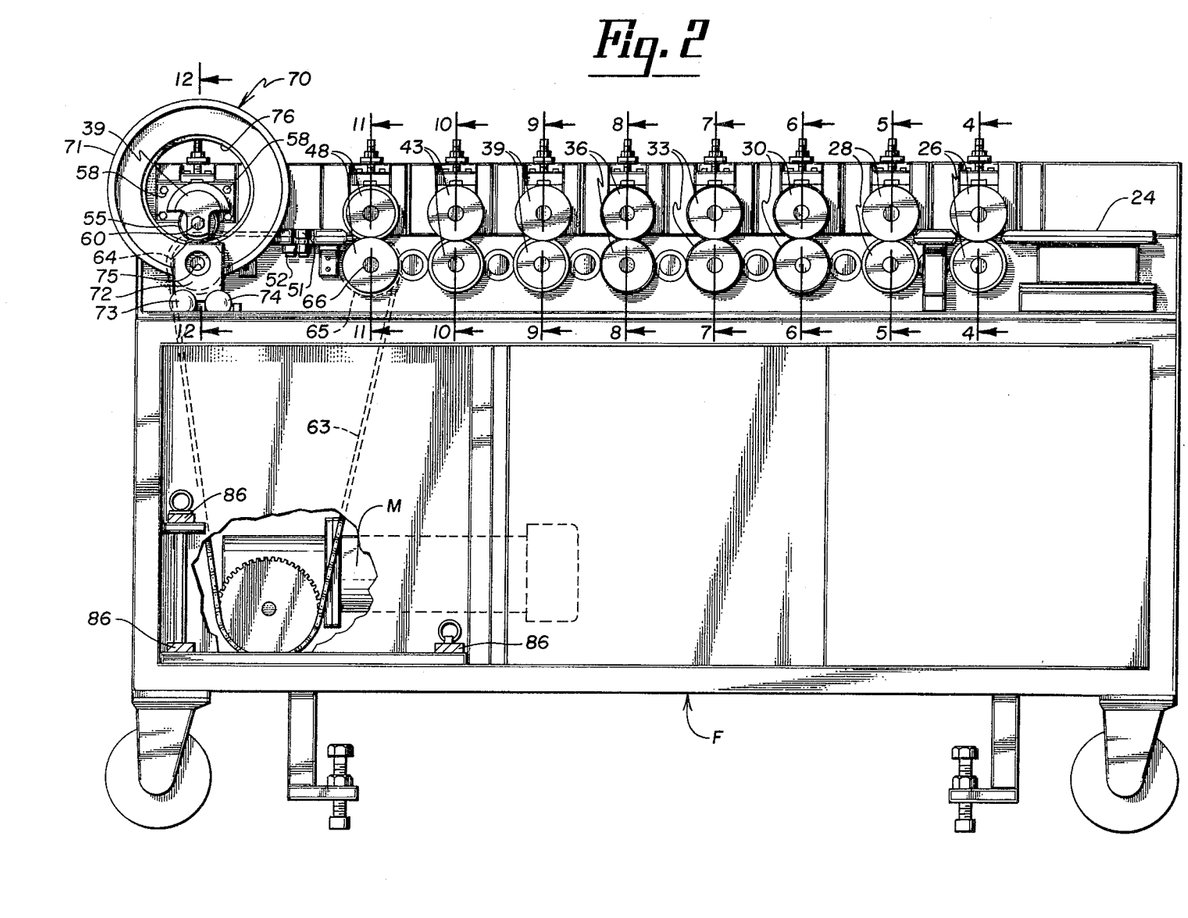
FIG. 2 is a front elevational view of the roller mill portion of the apparatus shown in FIG. 1, with the adjacent protective side screen removed and the adjacent wall broken away.
Figures 3, 16, 17:
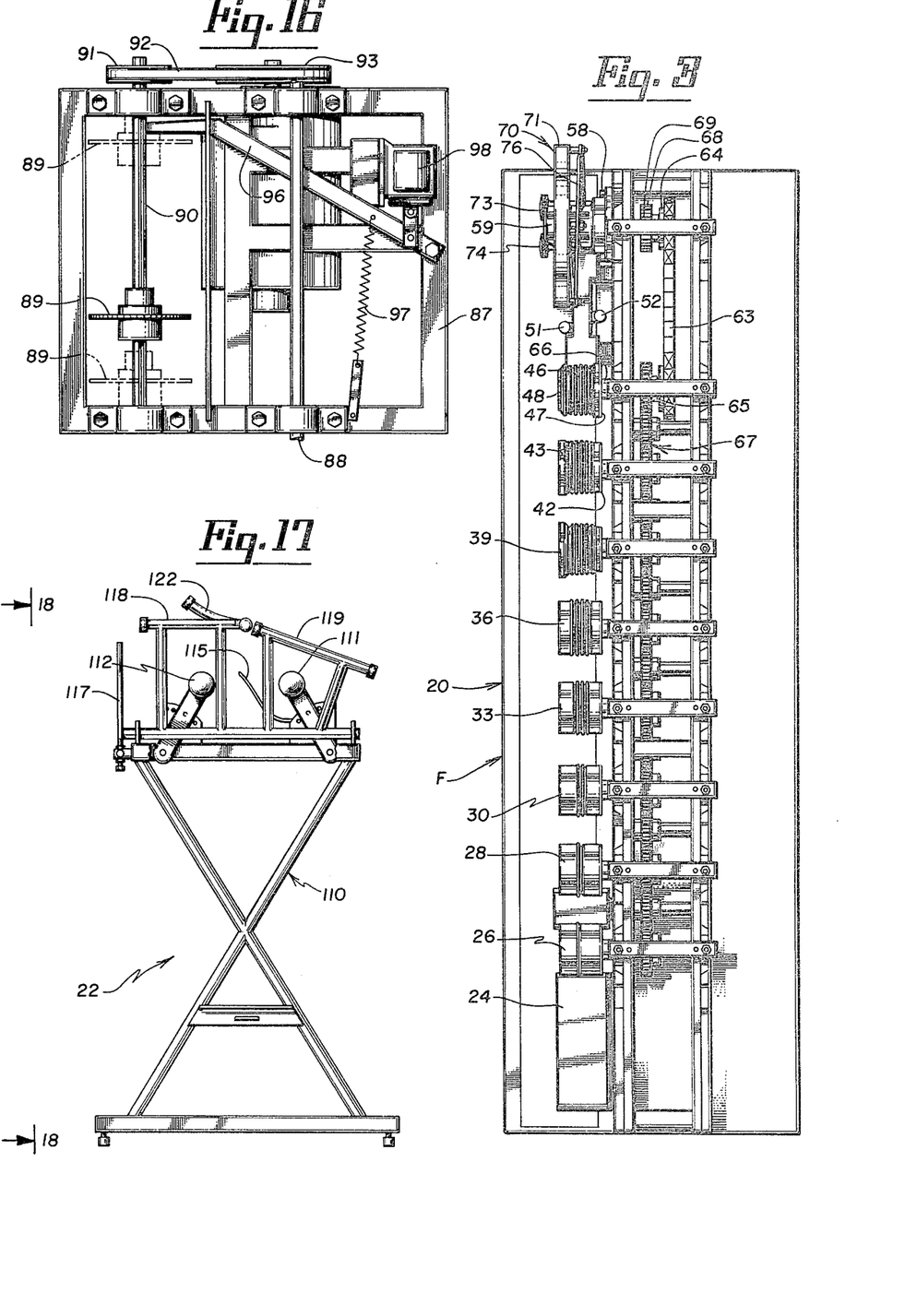
FIG. 3 is a top plan view of the roller mill shown in FIG. 2.
FIG. 16 is a plan view of the saw and its tiltable support, drive, and return arm.
FIG. 17 is a rear end elevational view of the runout table also shown in FIG. 1.
Figure 6:
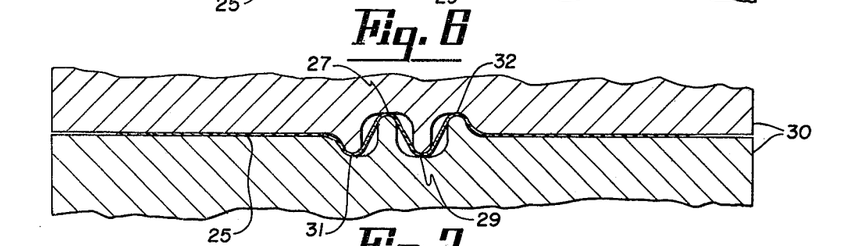
FIG. 6 is a schematic fragmentary sectional view taken at line 6—6 of FIG. 2 through the third set of rollers which further deform the strip, as shown.

Since both the upper and lower sets of rollers shown in FIGS. 2 and 3 are driven, the strip 25 is readily progressed through the mill. As the strip is driven through the next pair of rollers 30, the deformations at 27 and 29 are made more pronounced, as shown in FIG. 6, and at either side of the corrugations 26 and 29, the strip 25 is additionally deformed as at 31 and at 32 to commence the formation of two additional corrugations. It will be noted that the rollers 30 are so constructed as to complete the corrugations 27 and 29 and at the same time, initiate the formation of the two additional corrugations 31 and 32.

Figure 7:
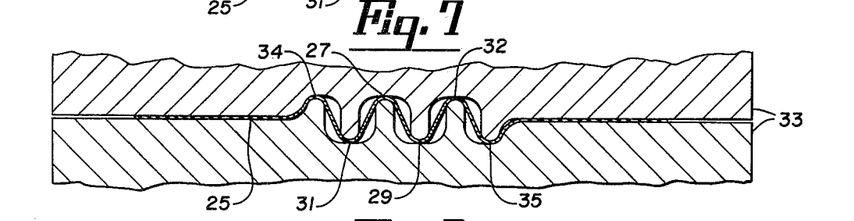
FIG. 7 is a schematic fragmentary sectional view taken at line 7—7 of FIG. 2, through the fourth set of rollers which further deform the strip, as shown.

As the strip 25 moves through the rollers 33 as shown in FIG. 7, the corrugations at 27 and 29 are held to dimension, but the rollers 33 are so constructed as to further deform the strip 25 at points 31 and 32 in order to complete the corrugations at those points and to further deform the strip as at 34 and 35 in opposite directions so as to initiate an additional corrugation at either side of those already formed as hereinbefore described.

Figure 8:
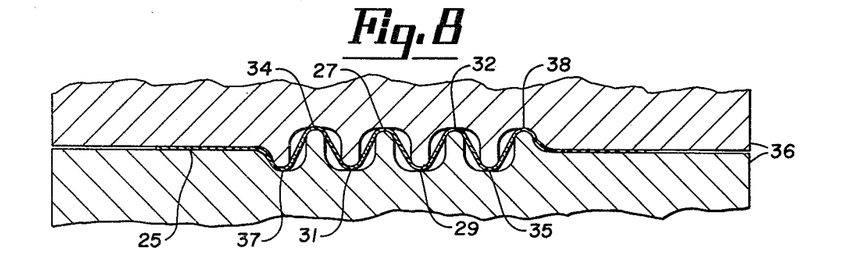
FIG. 8 is a schematic fragmentary sectional view taken at line 8—8 of FIG. 2 through the fifth set of rollers which further deform the strip, as shown.

As the strip 25 progresses through the rollers 36, as shown in FIG. 8, the corrugations formed at points 27, 29, 31, and 32 are held to dimension. The strip 25 is further deformed, however, at points 34 and 35 to complete the corrugations thereat. In addition, the rollers 36 carry additional die-forming surfaces so as to further deform the strip 25 in opposite directions as at points 37 and 38 so as to initiate the formation of an additional corrugation, one each at opposite sides of those previously formed.

Figure 9:
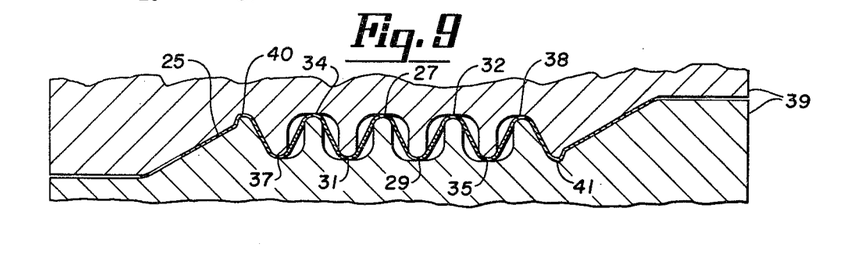
FIG. 9 is a schematic fragmentary sectional view taken at line 9—9 of FIG. 2 through the sixth set of rollers which further deform the strip, as shown.

As the strip 25 enters the sixth pair of rollers, shown in FIG. 2, the metal thereof at the crest or bottoms of the corrugations, as the case may be, at points 27, 29, 31, 32, 34, and 35, are held to dimension by the rollers 39. At points 37 and 38, however, the strip is further deformed to complete the corrugations thereat. Outwardly of each of these points the rollers further deform the metal strip 25 in opposite directions as at 40 and 41. It will be noted at this point in the deforming process, the initial step is taken toward forming the side edge portions of the strip 25 into seam elements.

Figure 10:
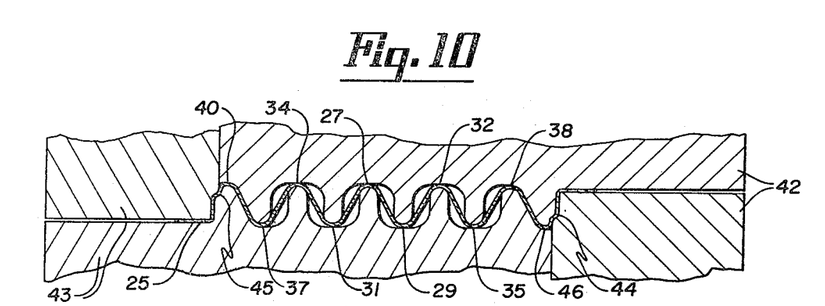
FIG. 10 is a schematic fragmentary sectional view taken at line 10—10 of FIG. 2 through the seventh set of rollers which further deform the strip, as shown.

As the strip 25 progresses through the seventh set of rollers, as shown in FIG. 10, all of the corrugations are held to their proper dimensions while further deformation is applied by the rollers 42 at the right and the rollers 43 at the left. Each of these two pair of upper and lower rollers is mounted on the same shaft and is driven. The rollers 42 further deform the strip as at 44 to shape the inner leg of the seam element yet to be formed, while the rollers 43 shape the inner leg 45 of the outboard seam element yet to be formed.

Figure 11:
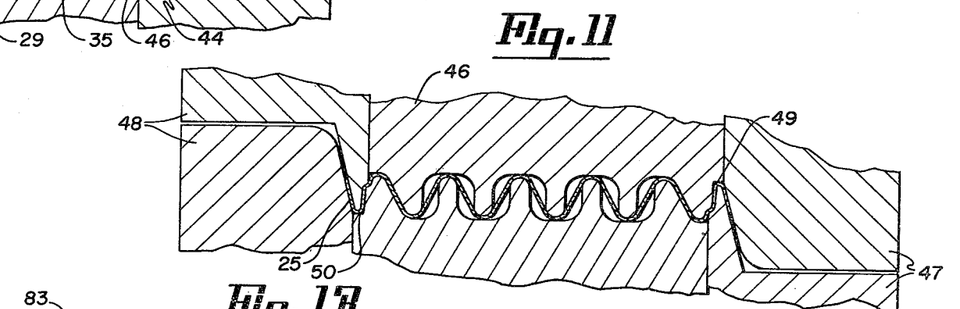
FIG. 11 is a schematic fragmentary sectional view taken at line 11—11 of FIG. 2 through the eighth set of rollers which further deform the strip, as shown, to produce seam elements at either side of the strip.

As the strip 25 progresses through the eighth set of rollers as shown in FIG. 11, the second and outer leg of the two seam elements are formed. By reference to FIG. 11, it will be seen that there are three sets of upper and lower rollers mounted on the same shaft, the central pair 46 serving to hold the corrugations to dimension, the inboard set 47 serving to form the outer leg of the inboard seam element which faces downwardly and the outer pair of rollers 48 serving to control the inner leg of the upwardly facing outboard seam element to dimension and forming the outer leg thereof to extend upwardly to within 15° of vertical, thereby providing most of the shape for that seam element. Thus, the inner pair of rollers 47 shape the strip 25 at point 49 to form the bottom of the inboard seam while the outer pair of rollers 48 in cooperation with the central rollers 46 shape the bottom 50 of the upwardly facing outboard seam elements.

As the shaped strip 25 leaves the eighth set of rollers shown in FIG. 11, it passes between a pair of rollers 51 and 52, which are mounted on vertical axes and engage the opposite sides of the strip to bring the outer legs of the inboard and outboard seam element to a truly vertical position. These can best be seen in FIGS. 2 and 3. The function of these two small rollers is to complete the forming of the outer flanges of the strip.

Figure 12:
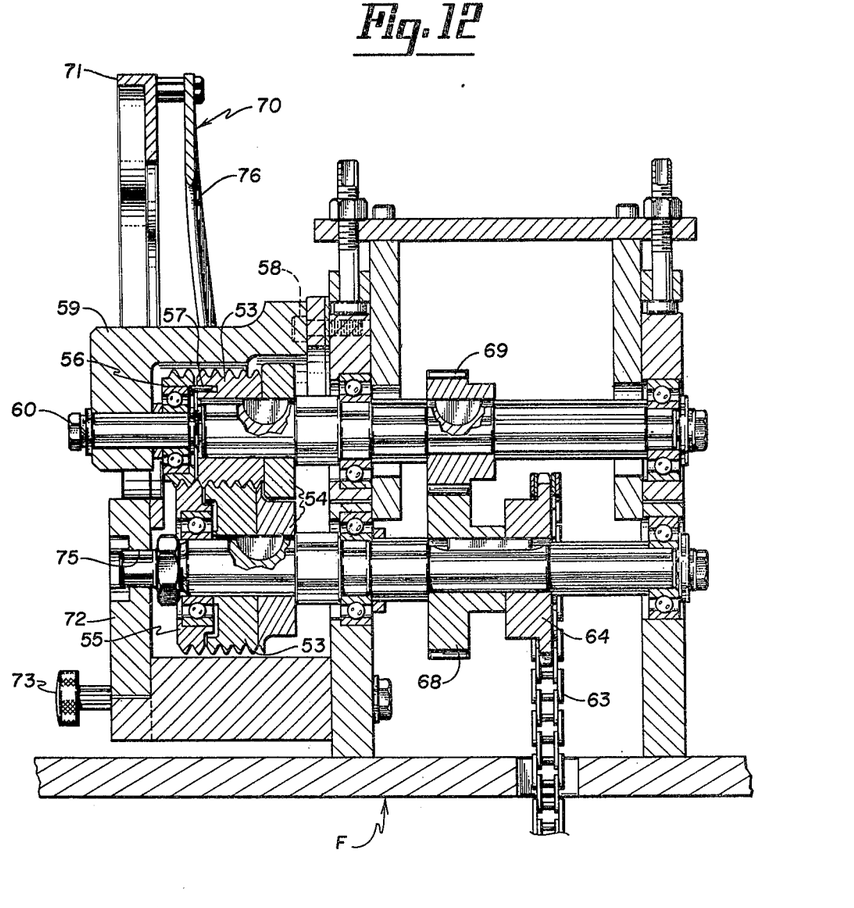
FIG. 12 is a vertical sectional view taken on an enlarged scale, at line 12—12 of FIG. 2 and showing the seam element forming rolls and the coaxial lock-seam forming rolls.
Figure 13:
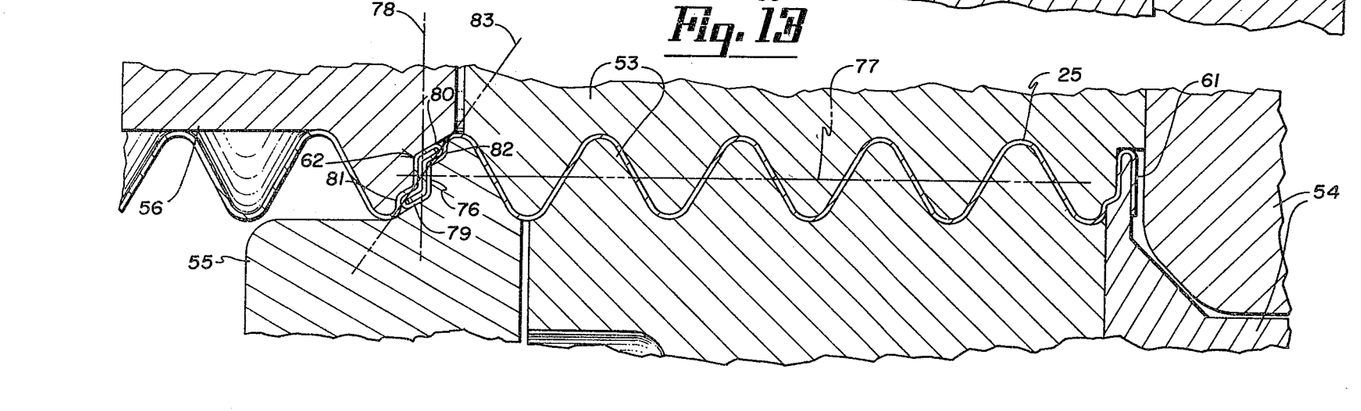
FIG. 13 is a fragmentary sectional view taken on a greatly enlarged scale of the encircled area of FIG. 12 to better illustrate the construction of the seam element forming rolls and the lock seam forming rolls, as well as the cross-sectional construction of the lock-seam.
Figure 14:
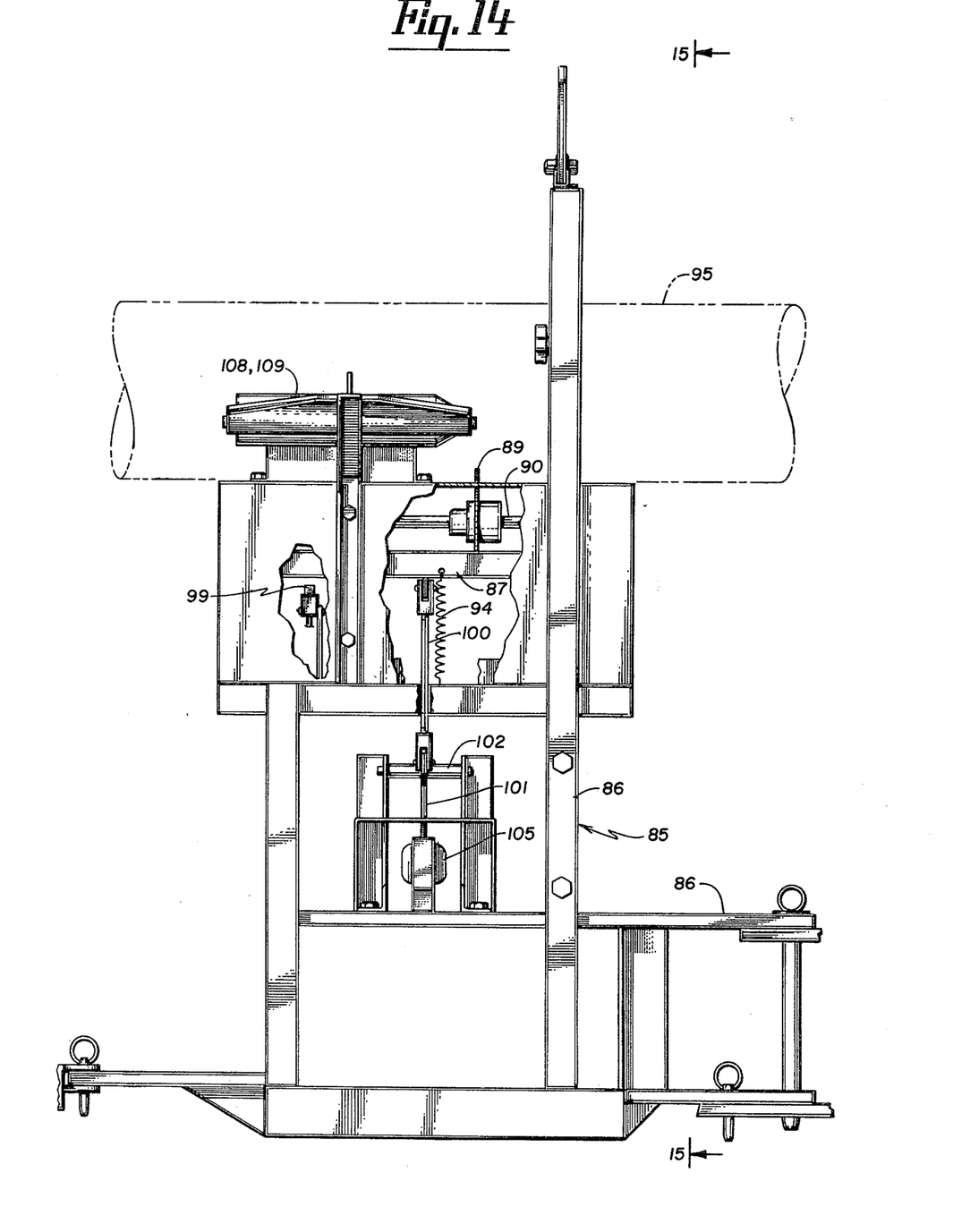
FIG. 14 is a right side elevational view of the saw assembly of FIG. 1 with parts broken away, the saw being shown in tube-engaging position and the produced tube illustrated in phantom.

As the strip 25 enters the final set of powered rollers, which are best shown in FIGS. 12 and 13, it passes through a central pair of rollers 53, which are mounted upon a common shaft with a pair 54 of inner, upper and lower rollers. All four of these rollers, shown in FIG. 2, are keyed to the shafts upon which they are mounted and are driven. Together, they hold the corrugations to dimension and ensure that the downwardly facing U-shaped inboard seam element has the proper shape. Mounted for free rotation rotation upon the same shaft which carries the lower roller of each of the pairs 53 and 54 is a further rotatable lock-seam-forming roller 55. Cooperating therewith and mounted coaxially with the upper roller of each of the pairs 53 and 54 is an upper and vertically adjustable lock-seam-forming roller 56. This lock-seam-forming roller is driven by means of a pin 57 which is carried in a bore provided therefor in the outer surface of the upper roller 53 and extends into a radial slot formed on the inner surface of the lock-seam-forming roller 56, the slot being of the same width as the diameter of the pin 57 and slightly longer radially to permit very slight vertical movement of the roller 56 relative to the roller 55. This movement is controlled through an adjustable screw 58 which secures the mounting bracket 59 which supports the stub shaft 60 upon which the lock-seam roller 56 is mounted. Thus, the lock-seam roller 56 is powered via the pin 57 while the lower lock-seam-forming roller 55 is not powered. The configuration of the die-forming surfaces of each of the rollers shown within the encircled area of FIG. 12 can best be seen and understood by reference to FIG. 13 wherein the downwardly facing inboard seam element 61 and the lock-seam 62 are clearly shown as formed by the seam element forming rollers and the lock-seam-forming rollers.

FIG. 2 shows each of the pairs of rollers described above rotatably mounted upon a movable frame F. A motor M provides power via chain 63, which drives a sprocket 64, which drives the shaft carrying the lower lock-seam-forming roller and a second sprocket 65 which is carried by the shaft mounting the eighth pair of rollers, as shown in FIG. 2. This sprocket 65 drives the shaft 66, which mounts the lower of the rollers of this set and in turn drives each of the other rollers of the first eight sets by means of a gear train, such as indicated by the numeral 67 in FIG. 3, one each of which is provided for each of the upper and lower rollers. The shaft which carries the upper seam element forming rollers 53 and 54 is driven by a pair of gears 68 and 69, as shown in FIG. 12.

As the strip 25 passes through the seam element forming rollers 53 and 54, it passes into a helically extending warping ring 70. This warping ring 70 is mounted upon a mounting ring 71 which in turn is carried by a mounting block 72 which is secured by a pair of threaded mounting pins 73 and 74 which have knurled heads to facilitate tightening and securing the mounting block in its proper position upon the frame F. The mounting block 72 is provided with a centering bore 75 which receives the end of the spindle which carries the rollers 53 and 54 and functions as a centering pin. Thus, when desired, a different warping ring 70 having a different diameter may be quickly and easily substituted for one previously utilized on the machine. The warping ring 70 has a circular inner warping surface 76 which engages the second corrugation outwardly of the inboard seam element 61 as the strip leaves the seam element forming rollers 53 and 54. This warping surface extends into that corrugation and guides the strip 25 in a helical path outwardly within the circular surface 76 until it reaches the point where the inboard seam element extends into and cooperatively engages the outboard seam element of the strip and enters the seam forming rollers 55 and 56 and is deformed thereby as shown in FIG. 13.

When the inboard seam element 61 has moved through the helical path and extends into the outboard seam element which faces upwardly, the outer leg of each of the elements extends to the bottom of the U-shaped structure of the other, as shown in FIG. 13. As they pass through the lock-seam-forming rollers, the lock-seam 62 is formed as a result of the compression which is applied by the upper lock-seam-forming roller 56. As indicated hereinbefore, this roller is vertically adjustable to a slight degree so that the compression applied to the two seam elements which become the seam 62, can be varied as desired, to adjust the "slipability" of the seam 62.

By reference to FIG. 13, the construction of the lock-seam 62 can best be appreciated. There it can be seen that the medial portions of the two seam elements are deformed into a medial portion which extends radially of the helical tube which is formed by the adjacent convolutions of the strip 25. It will be noted that the central and radially extending portion 76 of the lock-seam is symmetrically formed with respect to the neutral axis of the corrugation which has been identified by a broken line bearing the numeral 77. It is also constructed symmetrically with respect to the theoretical center line of the corrugation leg which is comprised by the seam 62 and has been identified by the numeral 78. Thus, the intermediate and radially extending portion of the lock-seam is symmetrical with respect to each of these lines. Since the intersection of these lines is the point at which the minimum effect of flexing is felt and since the portion 76 extends radially, this construction provides maximum strength and least vulnerability to flexing.

It will be noted that the intermediate portions 79 and 80 of the lock-seam extend at approximately 60° to the radially extending medial portion 76 and in opposite directions from opposite ends thereof. This creates a 60° angle or crimp at each end of the radial section 76 and locks the interengaging legs of the two seam elements together into an effective lock-seam. In addition, it will be noted that the inner leg of each of the seam elements is deformed so as to extend around the bottom of the adjacent seam element as at 81 and 82 to effectively lock the two seam elements together at these additional points and preclude relative shifting therebetween longitudinally of the seam element legs. Thus, the lock seam has a quadruple locking feature in that there are four separate points at which a locking action is provided, one each at each end of the radially extending portion 76 and one each at each of the terminal portions of the seam indicated at numerals 81 and 82. It will be noted that the seam element extends along and is symmetrical with respect to the slope line of the corrugation leg which it comprises. This slope line has been indicated by the numeral 83. It will also be noted that the lock seam constitutes a common leg of a corrugation of the adjacent convolutions of the strip 25.

FLYING SAW

Attached to the frame F and extending outwardly therefrom at approximate right angles is a flying cut-off device which has been indicated generally by the numeral 85. This device consists of a frame 86 connected to the frame F in position to receive the helical tubular pipe which emanates from the warping ring 70 toward the left as viewed in FIG. 3. Mounted upon the frame 86 is a generally rectangular saw mounting frame 87. This frame 87 is tiltably mounted upon a shaft 88 upon the frame 86 and is nearly balanced with respect to its axis of pivot, there being a slight over-balance in the direction of the saw 89, which is rotatably mounted upon a rotatable shaft 90 which is mounted for rotation about its longitudinal axis on the frame 87. The shaft 90 has a driving portion which is square in cross-section and upon which saw 89 is slidably mounted so that it may shift along the length of the shaft 90 while it is being rotated and driven by that shaft. The shaft 90 carries a pulley 91 at its outer end and a belt 92 extends therearound and around a drive pulley 93, which in turn is driven by an electrical motor carried by the frame 87 at the opposite side of the pivot shaft 88 with respect to the saw 89. As previously indicated, the over balance is in the direction of the saw so that normally the saw would tend to tilt downwardly to a limited extent and this downward tilt is aided by the urging of a light spring 94 which is connected to the frame 86 at one of its ends and to the frame 87 at its other end. Thus, the spring 94 and the over balance tend to urge the saw 89 to a retracted position which, as viewed in FIG. 15, would be lower than that actually shown and not in engagement with the metal tubing which has been shown in phantom and has been identified by the numeral 95. The cut-off saw 89 is a conventional circular blade using fine tooth pitch and rotated at a speed sufficient to deliver a clean, burr-free edge.

Pivotally mounted upon frame 87 is a saw-returning arm 96. This arm is constantly urged toward saw-returning position by a spring 97 and functions to return the saw 89 to its initial retracted position, shown in broken lines at the bottom of FIG. 16. In FIG. 16, the arm is shown in its retracted position after being drawn thereto prior to the initiation of a cut by a solenoid 98 which is activated by a microswitch which is released and moves to "closed" position when the saw support frame is rotated upwardly. Thus, as soon as the saw 89 is tilted upwardly, the return arm 96 is moved to its retracted position shown in FIG. 16 by the solenoid 98 and the saw 89 is free to move axially of the shaft 90 as it cuts the metal tubing and moves along therewith along the shaft 90.

The saw 89 is activated and tilted upwardly by a straight arm link 100 which is pivotally connected to the end of the frame 87 adjacent the saw 89 and extends downwardly therefrom to a point where it is pivotally connected to a 90° bell crank arm 101. This bell crank arm 101 is pivotally mounted at 102 upon the frame 85 and its depending arm is pivotally connected at 103 to a link 104 which is connected to an electrical solenoid 105. Solenoid 105 has a built in stop which limits the inward movement of the link 104 and, consequently, the upward tilting movement of the saw 89 when the solenoid is activated.

Figure 15:
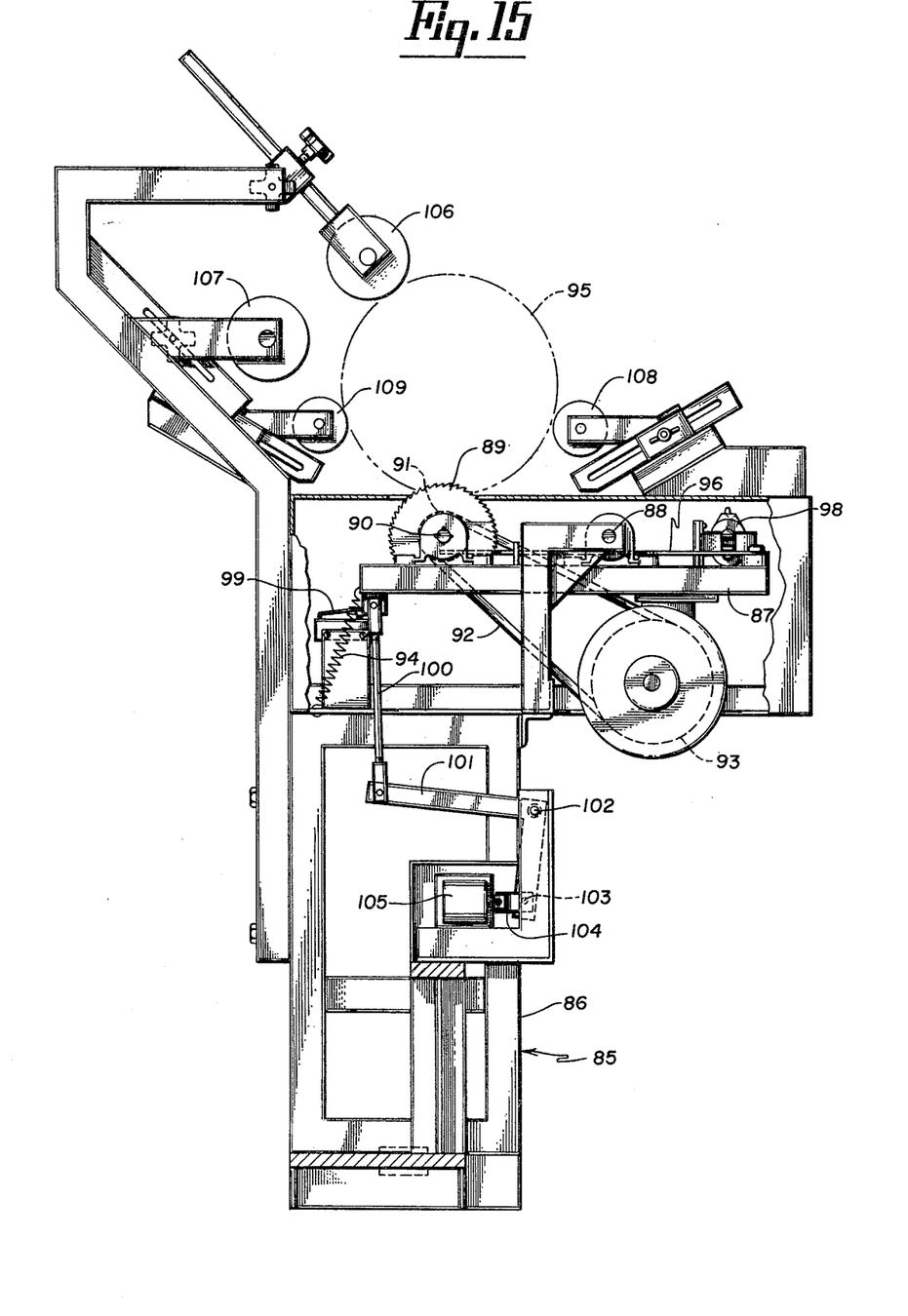
FIG. 15 is a vertical sectional view taken along line 15—15 of FIG. 14 with parts broken away and the saw in tubecutting position.

As best shown in FIG. 15, a plurality of adjustable guide rollers 106, 107, 108 and 109 are mounted upon the frame 85 and are adjustable to be moved to desired positions necessary to guide the helical tubing 95 as it emanates from the warping ring 70 through the warping ring mounting 71 at a slight angle (one degree to six degrees, depending upon the size of the tubing 95) to the axes of the seam-forming rollers. The shaft 90 and pivot 88 each extend parallel to the axis of the tube 95 as it emanates from the roller mill 20 and the axis of the shaft 90 is directly therebelow in the same vertical plane when it is elevated to cutting position, as shown in FIG. 15. Connected to the frame 85 is a runoff table indicated generally by the numeral 110. This runoff table 110 extends outwardly along the path of the pipe 95 as it emanates from the roller mill 20 across the saw support table, or frame 87. As shown, it is provided with several pair of guiding rollers 111, 112 and 113, 114. Mounted upon the runoff table 22 below one of the pair of rollers 111, 112 or 113, 114 (whichever is desired, depending upon the length of tube section to be cut) is a switch 115. This switch 115 is positioned so that it will be engaged and closed by the tubular member 95 as it rides outwardly on the rollers, such as 111, 112. It will be seen that the switch is positioned between the rollers and slightly therebelow. This switch is connected with the saw motor and when activated, causes the saw to commence to rotate.

A second switch 116 is located somewhat outwardly of the saw activating switch 115 and is similarly positioned to be engaged by the tubular member 95. When it is engaged by the tubular member 95, it activates the solenoid 105 and causes the saw 89 to be tilted upwardly to the cutting position shown in FIG. 15, it having been retracted heretofore and cleared by the pipe 95 as it moved across the saw assembly table. Activation of the solenoid 105 brings the saw 89 upwardly into engagement with the lower surface of the tubular member 95 and to a level, as shown in FIG. 15, of approximately ¾" into the interior of the tubular member. Since the tubular member is rotating rapidly, the rapidly rotating saw will quickly cut a section off the end of the tube and while doing so, the saw member 89 will slidably move along its square driving shaft 90 with the tubular member 95 and will soon complete the cut to free the desired section.

Figure 18:
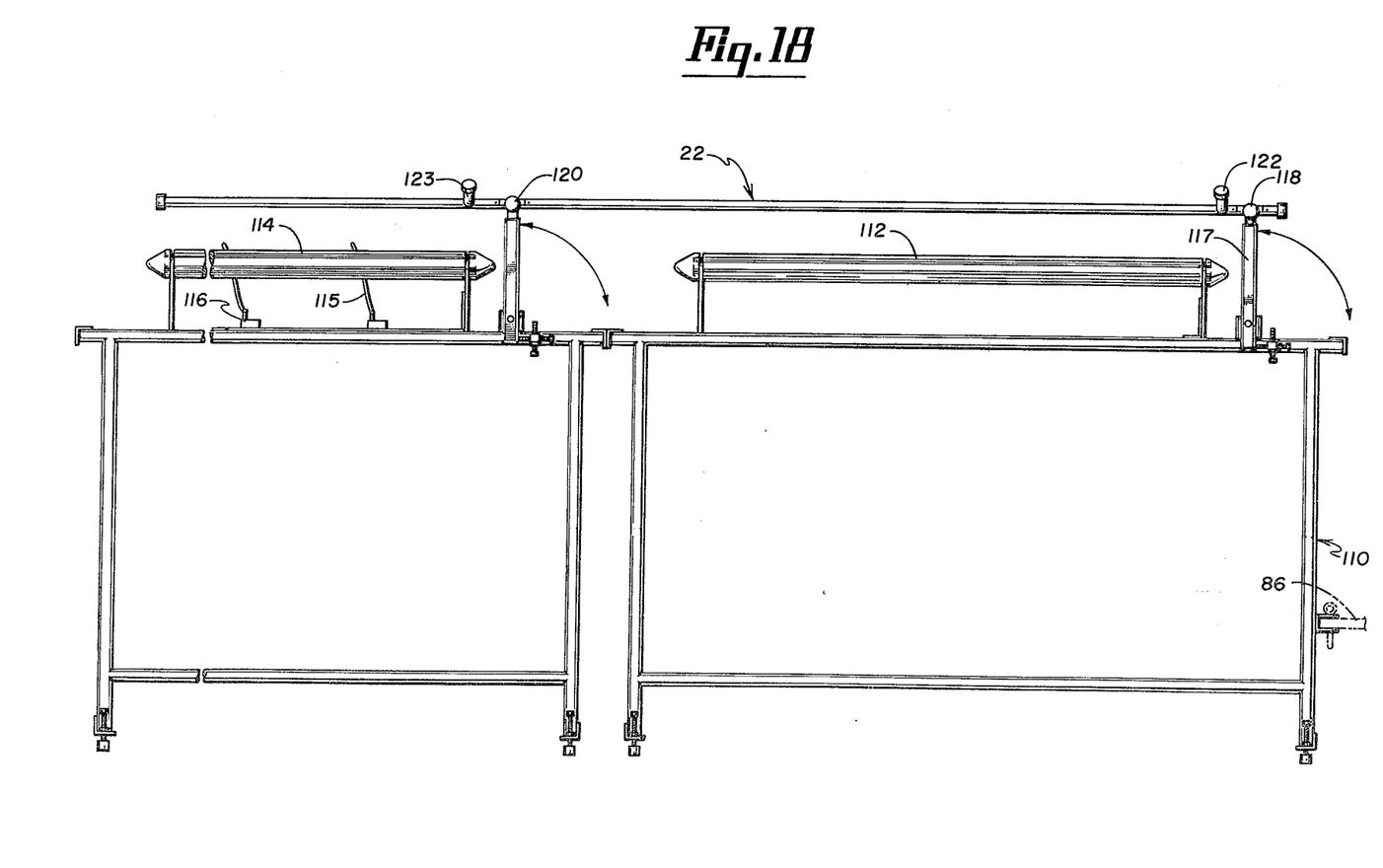
FIG. 18 is a right side elevational view of the runout table taken along line 18—18 of FIG. 17.

At the same instant that the saw support frame is rotated for engaging the saw blade with the pipe, or tube, the solenoid 98 is activated by the switch 116 to draw the return arm 96 to its position as shown in FIG. 16 so as to free the saw so as to permit it to slide along the shaft 90 as it is rotating. When the cut has been completed, the operator merely operates the dump lever 117 on the runoff table which causes the cut section of pipe to be lifted vertically and longitudinally, thereby clearing the end of the pipe which continues to emanate from the roller mill 20. When this occurs, the switches 115 and 116 are freed, which cuts off the power to the saw 89 and also to the solenoid 105. This permits the frame 87 to tilt back to retracted position, this function being aided by the spring 94 and the saw is permitted to cease rotating. When the frame 87 reaches its lowermost position, it engages the microswitch 99, which cuts off the power to the solenoid 98, and as a consequence, the return arm 96 returns the saw 89 to its retracted position, as shown at the bottom of FIG. 16 in broken lines. It will be seen that the runoff table 22 is provided with a plurality of pivotally mounted ejection arms 118, 119, 120 and 121. These are pivotally mounted upon the frame of the runoff table and when the dump crank 117 is operated, they swing upwardly to the position shown in FIG. 18, with a result that the cut section will be moved away from the saw assembly and will be projected away from the operator of the crank 117, as a result of the upwardly and inwardly curved projection arms 122 and 123.

In operation, the narrow strip of metal 25 passes through the first eight sets of rollers, the cross-sectional configuration of which can best be seen in FIGS. 4-11, inclusive, to form the longitudinal corrugations in the strip and the basic configuration of the opposite seam elements with a minimum of resultant hardening to the metal. Beyond the eighth set of rolls the strip passes between the two alignment rollers 51 and 52 and then enters the seam forming rollers 53 and 54. Immediately, thereafter, the warping surface 76 of the warping ring 70 engages the corrugation adjacent the downwardly facing seam element 61 and thenceforth guides the strip along said surface in a positive manner without any mandril to provide controlled and positive guidance which ensures true and complete interengagement of the inboard seam element with the outboard seam element as it reaches a position immediately ahead of the lock-seam-forming rollers 55 and 56. At this point, the outer leg of each of the two seam elements extends into the bottom of the other U-shaped seam element and as the two elements pass through the lock-seam-forming rollers, they are deformed into the cross-sectional configuration shown best in FIG. 13. The lock-seam-forming rollers 55 and 56 deform the lock-seam elements to provide the radially extending medial portion 76 and the two intermediate portions 79 and 80, extending at approximately 60° thereto. In addition, the inner leg of each of the elements is deformed as at 81 and 82 to extend around the end of the other seam element and provide additional locks against longitudinal shifting movement of the two seam elements. The lock-seam 62 which is thus formed comprises a common leg of a corrugation of the adjacent convolutions of the strip and extends along the slope of that corrugation and is symmetrical therewith. In addition, it is so geometrically formed as to be symmetrical with the vertical center line of the corrugation and, as a consequence, when flexing occurs the lock-seam, because of its geometrical location and its distribution relative to the neutral axis and the theoretical center line is subjected to an absolute minimum of stress resulting from the flexing action.

The action just described with respect to the formation of the lock-seam 62 continues to cause the contiguous convolutions of the strip to continuously form into a helically constructed tubular member which emanates from the roller mill 20 at a slight angle to the axis of the lock-seam-forming rollers.

As the tubular member 95 emanates from the roller mill 20, it passes outwardly over the flying saw support table and physically clears the same since the saw and saw support are in retracted position. The saw at this point is inactivated and, consequently, the tubular member passes out to the runout table long rollers 111 and 112 and engages the switch 115. When the end of the tubular member depresses switch 115, this closes the circuit to the same motor and the saw commences to rotate rapidly. When the end of the tubular member engages the switch 116, this activates the solenoid member 105 and, consequently, the saw support frame 87 and the saw 89 pivot upwardly above the shaft 88 until the rapidly rotating saw engages and cuts the lower side of the tube 95. Since the tube is rotating about its longitudinal axis, the saw needs to only travel with the tube sufficiently long for the tubular member to make one rotation about its longitudinal axis, at which time the cut will be completed.

At the same time as the solenoid 105 is activated, the upward movement of the frame 87 permits microswitch 99 to move to "closed" position and this activates the solenoid 98 which draws the saw return arm to its retracted position, as shown in FIG. 16. This permits the saw 89 to shift longitudinally of its driving shaft 90 so that it may move along with the tubular member 95 so long as is required.

When the cut has been completed, the operator merely operates the crank 117 to lift the cut section away from the saw and discharge it laterally. This frees each of the switches, 115 and 116 with the result that the solenoid 105 becomes deactivated and the spring 94 draws the same 89 downwardly to retracted position, the frame 87 thereby engaging microswitch 99 and moving it to "open" position to deactivate electrical solenoid 98 whereupon return arm 96 will cause the saw 89 to slide longitudinally of the shaft 90 back to its initial starting position. The saw, meanwhile, will have rotated to a stop and the entire mechanism is ready for the next cut.

The principal advantages of our invention are provided as a result of the unique geometry and construction of the lock-seam, which is provided. We have found that this lock-seam has greater strength, provides greater flexibility, and also provides "slipability" where desired. Since the lock-seam has four separate lock points, it provides much better resistance against possible opening of the seam which normally results in other seams from repeated flexing or excessive flexing, or axial torque. In addition to the fact that four separate lock points are provided in our lock-seam, its location and arrangement is unique and provides added strength, versatility, and capability with respect to repeated flexing, excessive flexing and/or the application of radial torque.

As can best be seen by reference to FIG. 13, our lock-seam extends along the slope of the common leg of a corrugation of the contiguous convolutions of the strip in the tube and thus it offers a minimum resistance to flexing since it will fold entirely within the corrugation if the flexing is made toward the seam. If it is made away from the seam, the unique quadruple locking points provide a maximum of resistance against opening of the seam. Moreover, since it is located on the neutral axis, which by definition, is a line along which the minimum stress is applied, a lock-seam is better able to withstand such stresses merely because of its location and arrangement alone. Moreover, it is symmetrically disposed with respect to the neutral axis and also with respect to the theoretical center line of the corrugation. It is also symmetrically disposed with respect to the slope line of the corrugation. Since it extends along the slope line of the corrugation, it does not tend to fight normal flexing, as is the case with seams which are otherwise located. If the flexing is toward the seam, there is no stress upon the seam whatever because of its unique location and disposition and if the tube is flexed sufficiently far, the seam will disappear entirely within the corrugation and offer no resistance to flexing. As a consequence, it is possible to flex a tube made in accordance with our invention about a diameter that represents as little as 33 percent of the pipe diameter whereas most pipe heretofore known with other types of seams cannot be bent about a diameter which is much less than the complete diameter of the pipe. Thus it can be seen that we have provided a marked improvement in the capabilities of such a corrugated tube.

We have found that with our quadruple lock-seam, a pipe utilizing such lock seams permits the pipe to be flexed numerous times and we find that the bends and depressions of the four locks provided by our lock-seam prevent the joint from leaking as a result of excessive bending.

Another added feature of our lock-seam is its versatility. It is possible through the use of our lock-seam to provide a pipe which will readily permit the application of axial torque without any serious consequences to the seam. Since the extent of compression is reduced by adjusting the position of the upper lock-seam roll 56, a tube can be produced which will permit substantial radial torque to be applied with resultant "slipability" being provided. By "slipability", we refer to the ability of the tube to be twisted about its longitudinal axis without causing leakage or separating in the seams.

One of the advantages of our invention is that it is possible to manufacture relatively strong corrugated tubing from relatively light and inexpensive metal, such as light gauge aluminum. Moreover, it is possible to produce such tubing in relatively high speeds so that the cost of the same is substantially reduced. With the machine disclosed and claimed herein, for example, the strip speed entering the roll at the points shown in FIGS. 12 and 13 is 140 f.p.m. and helical tubes can be made at the rate of 18 f.p.m. for a 3" diameter tube. A 12" diameter tube can be made as rapidly as 4½ f.p.m. Thus, it can be seen that we have provided a highly efficient apparatus and method for manufacturing improved corrugated tubing.

As noted hereinbefore, the methods which we utilize provide the necessary longitudinal corrugations in the strip 25 with a minimum of hardening and, consequently, the resultant tubing has marked strength when the nature of the light gauge metal which is utilized is considered. The design of our seam or its geometry minimizes the adverse effects of flexing upon a tube made in accordance with our invention. Since it is symmetrically arranged with respect to the neutral axis of the corrugation, there is a minimum adverse stress placed upon the seam during repeated flexing and since the seam extends along the slope of the corrugation leg, there is an absolute minimum adverse effect upon the seam when the tube is flexed. No other corrugated tubular members, to our knowledge, have been heretofore so designed as to take maximum advantage of the fact that minimum stress is located along the neutral axis of the corrugation and upon the seam which constitutes a common leg of a corrugation of contiguous convolutions. We have found that extended flexibility and the "slipability" of our tubes do not inhibit their ability to maintain a minimum pressure (6" W.C.) or vacuum (6" W.C.). Our pipe can take velocities in excess of 6000 f.p.m.

It will, of course, be understood that various changes may be made in the form, details, arrangement and proportions of the parts without departing from the scope of our invention which consists of the matter shown and described herein and set forth in the appended claims.

What is claimed is:

1. A flying cut-off device for cutting off sections from an elongated member as it is being moved longitudinally, comprised of:
    (a) a frame;
    (b) a saw support pivotally mounted on said frame for tilting movement thereof about an axis and between a retracted position and a cutting position;
    (c) a power-driven shaft rotatably mounted upon said support for rotation thereof about its longitudinal axis and extending parallel to and laterally of the axis of tilting movement of said support;
    (d) a circular saw slidably and drivably mounted on said shaft for rotating therewith in driven relation and being freely slidable in non-biased relation longitudinally thereof during rotation between an initial position and a cut-completed position and
    (e) means mounted on said frame in cooperation with said saw being shiftably mounted relative to said shaft for movement along its length for returning the saw to its said initial position subsequent to completion of each cut.

2. The structure defined in claim 1, and a tube-feeding mechanism positioned adjacent to said frame and discharging tube thereacross along a line substantially parallel to said shaft and adjacent thereto in position to be engaged and cut by said saw when the latter is tilted to its cutting position.

3. The structure defined in claim 1, and
    (f) electrically activated tilting mechanism connected to said saw support for tilting said saw when activated to cutting position, and
    (g) switch mechanism electrically connected to said tilting mechanism in activating relation for activating the same to tilt said saw to cutting position and adapted to be mounted in the path of such a longitudinally moving elongated member for activation thereby.

4. The structure defined in claim 1, and
    (f) a metal tube producing mechanism positioned adjacent to said frame and discharging metal tubular structure across said saw support along a line substantially parallel to said shaft and adjacent thereto in the path of said saw when it is moved from said initial position to cutting position;
    (g) an electrically activated saw-tilting mechanism connected to said saw support for tilting said saw support and said saw when activated to cutting position, and
    (h) switch mechanism positioned in the path of such tubular structure for activation thereby as it moves across said saw support and activating said saw-tilting mechanism when engaged by tubular structure.

5. The structure defined in claim 4, and
    (i) additional switch mechanism positioned inwardly of said saw in the path of such tubular structure for activation thereby as it moves across said support and connected electrically to said power-driven shaft in activating relation when engaged by such tubular structure and in deactivating relation when not so engaged by such tubular structure.

6. The structure defined in claim 4, and
    (i) additional switch mechanism mounted in the path of such tubular structure for activation thereby as it moves across said support and connected electrically to said power-driven shaft in activating relation when engaged by such tubular structure and in deactivating relation when not so engaged by such tubular structure, and
    (j) ejection mechanism mounted in the path of such tubular structure for ejecting the cut-off sections thereof after such sections have been cut off by said saw.

7. In apparatus for producing pluralities of sections of tubular structure,
    (a) power-driven tubular structure-producing mechanism constructed and arranged to produce continuous tubular structure from flat narrow strips of formable metal of light gauge and to rotate such tubular structure about its longitudinal axis as it is ejected therefrom in its continuous tubular form;
    (b) a frame associated with such mechanism and located adjacent thereto;
    (c) a saw support pivotally mounted on said frame for tilting movement thereof about an axis extending parallel to and laterally of the longitudinal axis of the rotating tubular structure as it is ejected from said mechanism;
    (d) said support being tiltable between a retracted position and a cutting position relative to such tubular structure as it is ejected from said mechanism;

(e) a power-driven shaft rotatably mounted upon said support for rotation thereof about its longitudinal axis and extending parallel to and laterally of the axis of tilting movement of said support;

(f) a circular saw slidably and drivably mounted on said shaft for rotation therewith in driven relation and being freely slidable in non-biased relation longitudnally thereof during rotation between an initial retracted position and a cut-completed position, and being tiltable with said support between said initial retracted position to engaging and cutting position relative to such tubular structure as the latter is rotated and ejected from said mechanism;

(g) means mounted on said frame in cooperation with said saw and being shiftably mounted relative to for movement said shaft along its length for returning the saw to its initial position on said shaft subsequent to the completion of each cut and prior to initiation of its next consecutive cut;

(h) an electrically activated saw-tilting mechanism connected to said saw support for tilting said saw support and said saw from retracted position to engaging and cutting position relative to such tubular structure;

(i) switch mechanism mounted in the path of such tubular structure as it is ejected from said tube producing mechanism for activation thereby as the tubular structure moves across said saw support and connected electrically to said tilting mechanism and activating the same when said switch mechanism is engaged by the tubular structure and deactivating the same when so engaged;

(j) means connected to said saw support for automatically returning the same and said saw to retracted position when said switch mechanism is not so engaged; and (k) additional switch mechanism mounted in the path of such tubular structure as it moves across said saw support and connected electrically to said power-driven shaft in rotation activating relation when engaged by such tubular structure and in deactivating relation when not so engaged by such tubular structure.

8. The structure defined in claim 7, wherein said switch mechanisms are movably mounted to permit locating the same at different positions along the path of such tubular structure to cause said saw to cut off sections of such tubular structure of whatever length is desired.

9. The structure defined in claim 7, and (l) ejection mechanism located adjacent said frame and positioned below the path of longitudinal movement of such tubular structure as it is ejected from said producing mechanism and constructed and arranged, when activated, to more the cut sections of such tubular structure away from the uncut sections immediately after a cut has been completed by said saw.

* * * * *

UNITED STATES PATENT AND TRADEMARK OFFICE
CERTIFICATE OF CORRECTION

PATENT NO. : 4,244,202

DATED : January 13, 1981

INVENTOR(S) : Leroy E. Anderson; Michael P. Schmidt; William W. Weaver

It is certified that error appears in the above-identified patent and that said Letters Patent are hereby corrected as shown below:

Cancel "same" and substitute therefor --saw-- in Column 9, Line 40

Signed and Sealed this

Twenty-first Day of April 1981

[SEAL]

Attest:

RENE D. TEGTMEYER

Attesting Officer

Acting Commissioner of Patents and Trademarks